(12) United States Patent
Weichao (10) Patent No.: US 7,679,009 B2
(45) Date of Patent: Mar. 16, 2010

(54) WEIGHING SENSOR FOR AN ELECTRONIC SCALE AND AN ELECTRONIC SCALE

(75) Inventor: Pan Weichao, Guangdong (CN)

(73) Assignee: Zhongshan Transtek Electronics Co., Ltd., Zhongshan, Guangdong (CN)

( * ) Notice: Subject to any disclaimer, the term of this patent is extended or adjusted under 35 U.S.C. 154(b) by 0 days.

(21) Appl. No.: 11/721,126

(22) Filed: Jun. 8, 2007

(65) Prior Publication Data

US 2008/0271931 A1  Nov. 6, 2008

Related U.S. Application Data

(63) Continuation-in-part of application No. PCT/CN2006/001392, filed on Jun. 20, 2006.

(30) Foreign Application Priority Data

Jan. 24, 2006  (CN) .................. 2006 2 0054396 U (51) Int. Cl.
*G01G 3/14* (2006.01)
(52) U.S. Cl. .................. 177/211; 177/229; 73/862.626
(58) Field of Classification Search .............. 177/211, 177/DIG. 9; 73/862.471–862.474, 862.627–862.634
See application file for complete search history.

(56) References Cited

U.S. PATENT DOCUMENTS

| | | | | |
|---|---|---|---|---|
| 4,574,899 | A * | 3/1986 | Griffin | 177/211 |
| 4,744,254 | A * | 5/1988 | Barten | 73/862.622 |
| 5,510,581 | A * | 4/1996 | Angel | 177/211 |
| 5,714,695 | A * | 2/1998 | Bruns | 73/862.641 |
| 5,814,740 | A * | 9/1998 | Cook et al. | 73/862.641 |
| 5,847,329 | A | 12/1998 | Anthoine-Milhomme et al. | |
| 5,925,832 | A * | 7/1999 | Bruns | 73/862.635 |
| 5,929,391 | A | 7/1999 | Petrucelli et al. | |
| 6,711,960 | B2 * | 3/2004 | Kobayashi et al. | 73/862.629 |
| 7,078,631 | B2 * | 7/2006 | Wang et al. | 177/211 |
| 7,429,705 | B2 * | 9/2008 | Genoud et al. | 177/210 EM |

FOREIGN PATENT DOCUMENTS

CN 2690866 Y 4/2005

OTHER PUBLICATIONS

International Application No. PCT/CN2006/001392, International Search Report dated November 16, 2006.

* cited by examiner

*Primary Examiner*—Randy W Gibson
(74) *Attorney, Agent, or Firm*—Matthew W. Witsil; Moore & Van Allen PLLC (57) ABSTRACT

The invention discloses a weighing sensor and an electronic scale provided with the same. The weighing sensor comprises a flat plate formed into helical shape, including successively a load-supporting portion, a strain portion and a bearing portion from the center to the outer of this plate, with the load-supporting portion situated between and surrounded by the bearing portion and the strain portion; wherein the load-supporting portion and the bearing portion are respectively used to bear the acting force and the reaction force in opposite directions, and a strain gauge is mounted on the strain portion. The electronic scale comprises at least three weighing sensors, wherein the bearing portion of the sensor is mounted on the scale body, the load-supporting portion directly contacts the supporting leg of the scale, which contacts the plane on which the scale is positioned. The present invention has small thickness, simple structure and low manufacturing cost.

9 Claims, 7 Drawing Sheets

(Prior Art)

Fig.12

(Prior Art)

Fig.13

(Prior Art)

Fig.14

WEIGHING SENSOR FOR AN ELECTRONIC SCALE AND AN ELECTRONIC SCALE

STATEMENT OF RELATED APPLICATIONS

The present application is a continuation-in-part application of International Patent Application No. PCT/CN06/001392, entitled "A Sensor and a Scale Provided with the Same," filed Jun. 20, 2006, and claims priority to Chinese Patent Application No. 200620054396.9, entitled "A Sensor and an Electronic Scale Provided with the Same," filed on Jan. 24, 2006, both of which are incorporated herein by reference in their entirety.

FIELD OF THE INVENTION

The present invention relates to a sensor, in particular a self-supporting weighing sensor used in an electronic human weight scale. The present invention also relates to an electronic scale provided with three or more such sensors.

BACKGROUND OF THE INVENTION

The elastomer of a weighing sensor mainly comprises three parts, that is, a first stress surface for transferring acting force, a second stress surface for transferring reaction force, and a strain rod connected between the first stress surface and the second stress surface. In a general weighing sensor, one or two stress surfaces have to be riveted or screw-fixed onto a rigid base frame or a supporting beam for transferring the acting force and the reaction force.

The elastomer of a self-supporting weighing sensor is shaped by punching a piece of sheet metal into two stress surfaces and a strain rod, wherein one of the stress surfaces forms a bearing frame to make the sensor itself stably disposed on the base frame of the scale body for directly transferring acting force to cut down the cost of the sensor and the whole electronic scale without fixing a supporting beam onto the base frame via a hard connection.

In order to eliminate or reduce partial load and repeatability error of the self-supporting weighing sensor, the other stress surface of the sensor, which transfers reaction force, transfers the reaction force in a manner of point contact.

Figure 12:
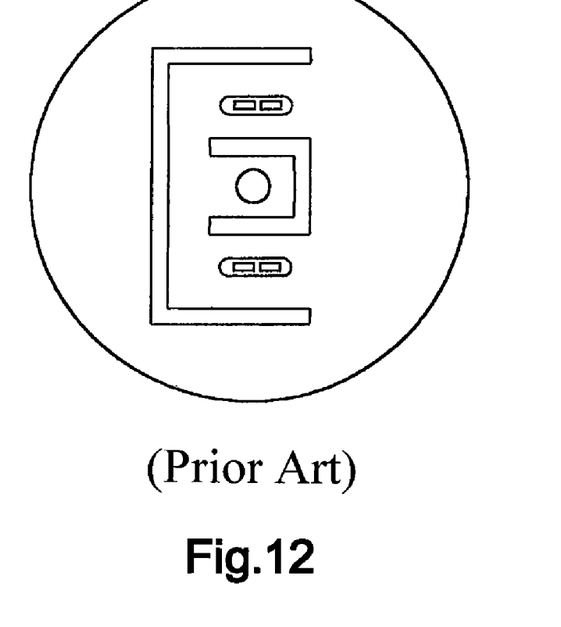
FIG. 12 is the structure of one sensor in prior art.
Figure 13:
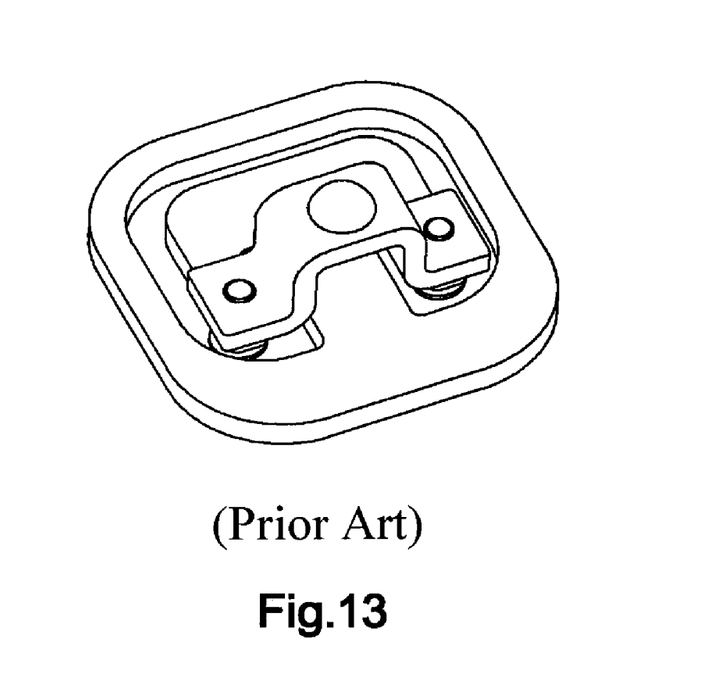
FIG. 13 is the structure of another sensor in prior art.
Figure 14:
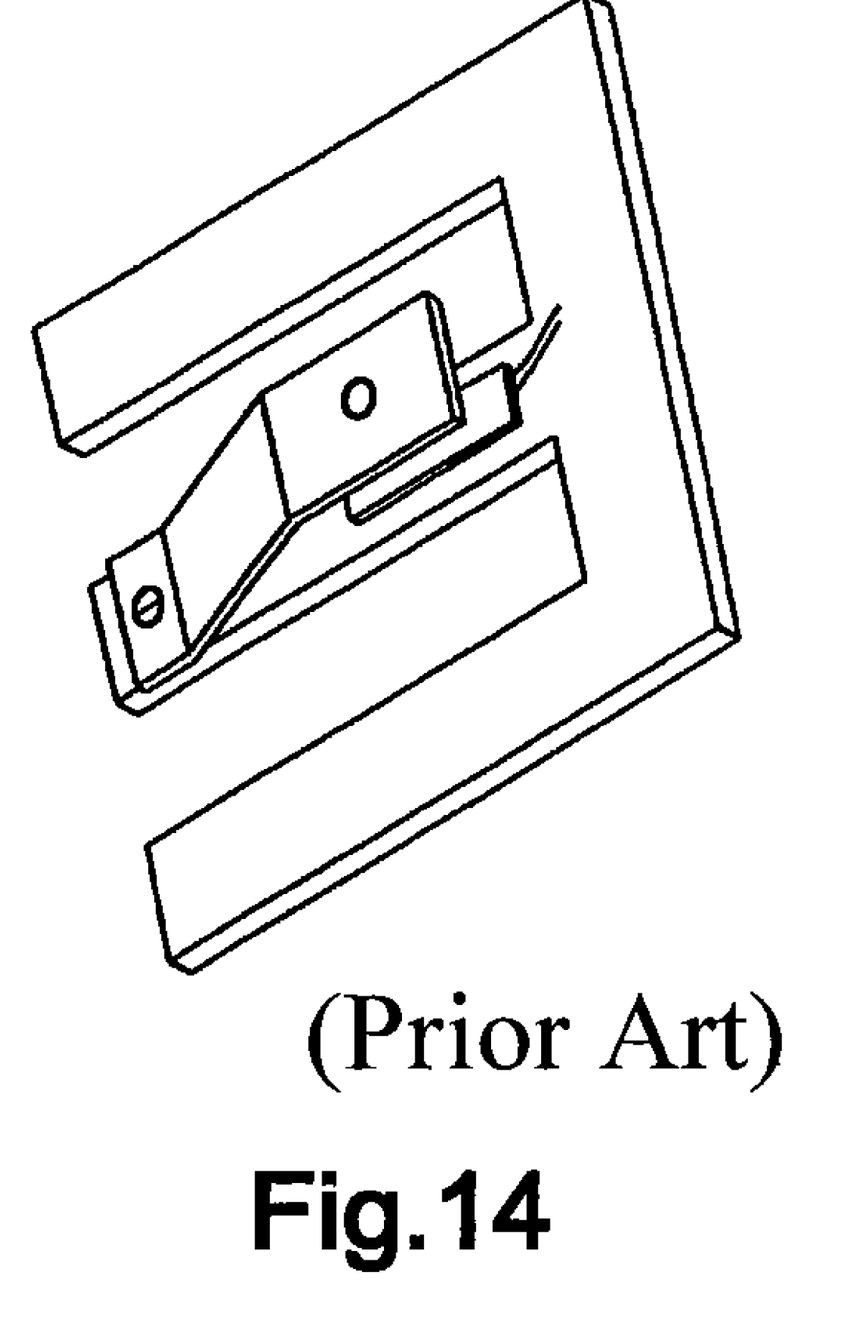
FIG. 14 is the structure of further another sensor in prior art.

For the present, there are three kinds of common self-supporting weighing sensors used for the electronic scales. The first kind is of "M" type structure, as shown in FIG. 12, of which the particular structure is described in detail in U.S. Pat. No. 5,929,391, published on Jul. 27, 1999; the second kind is shown in FIG. 13, of which details are described in CN patent application No. 96106220.7, published on Jul. 2, 2003; and the third kind is of "E" type structure, as shown in FIG. 14, of which details are described in CN patent No. 200420015320.6, published on Apr. 6, 2005.

The first kind, i.e., the sensor with "M" type structure, has a bearing frame for self-supporting and a load-supporting point for transferring the reaction force, and is convenient for installation. However, it has two strain rods, and the strain gauge must be bonded to each of them to ensure precision, which highly increases the cost. The second and the third types of sensors introduced in the above patent documents both have bearing frames for planar self-supporting, but the other stress surface can not directly be stressed, so load-supporting portions are necessarily added to achieve point stressing, which is also costly.

SUMMARY OF THE INVENTION

One object of the present invention is to provide a sensor with low manufacturing cost, simple structure and small thickness. Another object of the present invention is to provide a scale provided with three or more such sensors. To achieve the above objects, the present invention adopts the following technical solutions.

According to the first aspect of the invention, there is provided a weighing sensor, comprising a flat plate formed into a helical shape, which includes successively a load-supporting portion, a strain portion and a bearing portion from the center to the outer of the helical flat plate, with the load-supporting portion situated between and surrounded by the bearing portion and the strain portion; wherein the load-supporting portion and the bearing portion are respectively used to bear the acting force and the reaction force thereof which are opposite in directions; and a strain gauge is mounted on the strain portion.

Optionally, in the weighing sensor according to the first aspect of the invention, a spherical or conical protrusion or depression is provided on the load-supporting portion so that the acting force directly acts on the top end of the protrusion or the bottom end of the depression.

Preferably, in the weighing sensor according to the first aspect of the invention, the bearing portion is in "C"-shape, surrounding the load-supporting portion from three sides, while the strain portion is in planar-block shape, surrounding the load-supporting portion from the remaining side.

Further preferably, in the weighing sensor according to the first aspect of the invention, the strain portion and the bearing portion are substantially situated on the same plane, while the load-supporting portion protrudes from this plane via a step provided at the abutting site between the load-supporting portion and the strain portion.

Yet preferably, the weighing sensor according to the first aspect of the invention is integrally formed with one sheet metal.

According to the second aspect of the invention, there is provided an electronic scale, comprising at least three weighing sensors according to the first aspect of the invention, wherein the bearing portion of the sensor is mounted on the scale body, the load-supporting portion directly contacts the supporting leg of the scale, and the supporting leg contacts the plane on which the scale is positioned.

Preferably, the load-supporting portion of the sensor makes point contact with the supporting leg, and there may exist relative movement between them. The supporting leg includes a base frame; a sensor supporting plate is mounted in the base frame; and a cover plate is mounted on the base frame.

The beneficial effects of the present invention are as follows: the load-supporting portion, the strain portion and the bearing portion of the present invention are all formed out of the same piece of sheet metal by punching, which may directly bear the reaction force transferred by the supporting leg of the scale, no need for additionally fixing a metal support thereon. Therefore, the sensor with such a structure is simple in structure and for processing, low-cost for manufacturing, convenient for installing, and capable of making the entire electronic scale thinner and more fashionable.

BRIEF DESCRIPTION OF THE DRAWINGS

The present invention is further illustrated through embodiments in conjunction with the accompanying drawings hereunder, in which.

DETAILED DESCRIPTION OF THE INVENTION

Figure 1:
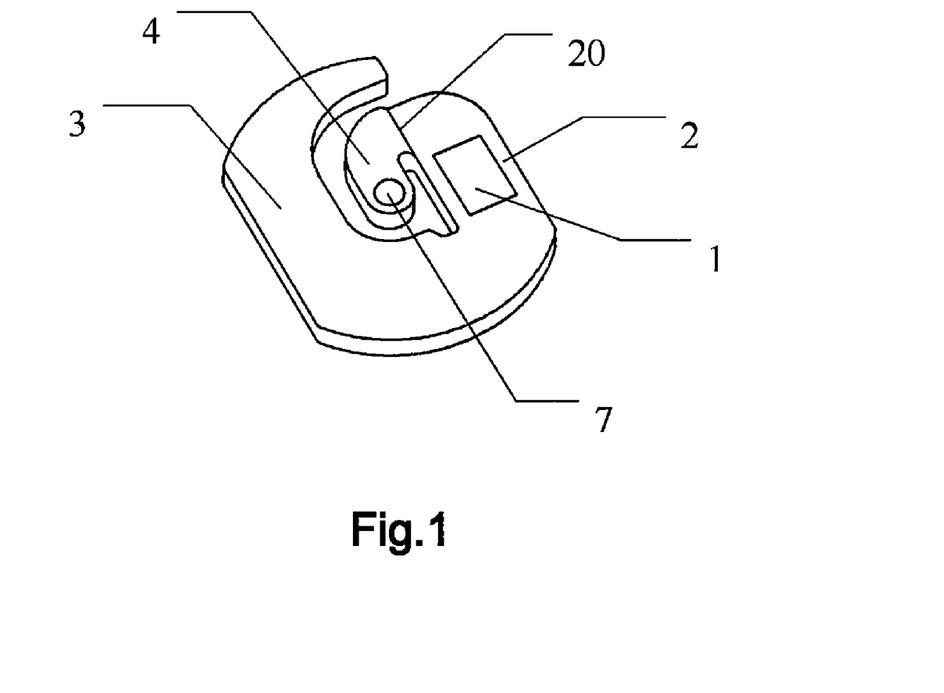
FIG. 1 is an illustration of a weighing sensor according to the present invention.
Figure 2:
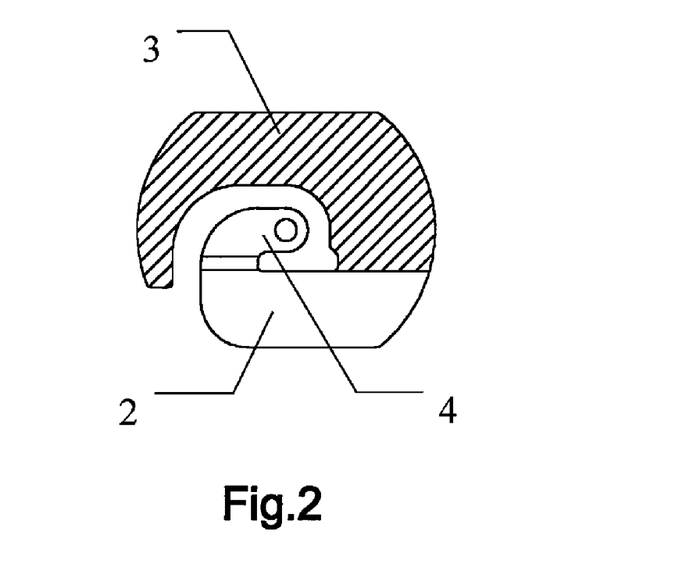
FIG. 2 is an illustration of a stress surface of a bearing portion of the weighing sensor according to the present invention.

As shown in FIG. 1, a weighing sensor according to an embodiment of the present invention as a whole is in a helical shape, and integrally formed out of a piece of sheet metal. Along the helical line from the center to the outer of the helical flat plate are successively a load-supporting portion 4, a strain portion 2 and a bearing portion 3. The strain portion 2, shaped in flat block, has a strain gauge 1 mounted thereon, and can be bent and deformed under the influence of the weight to be measured. On both sides of the strain portion 2, the load-supporting portion 4 and the bearing portion 3 are provided respectively for bearing the acting force and the reaction force which are opposite in directions. The bearing portion 3 is in "C"-shape. As seen from the whole of the helical sensor, the load-supporting portion 4 is situated between the bearing portion 3 and the strain portion 2, of which three sides are surrounded by the bearing portion 3, while the remaining side surrounded by the strain portion 2 shaped in flat block. As shown in FIG. 2, the shaded section is the stress surface of the bearing portion 3.

Figure 3:
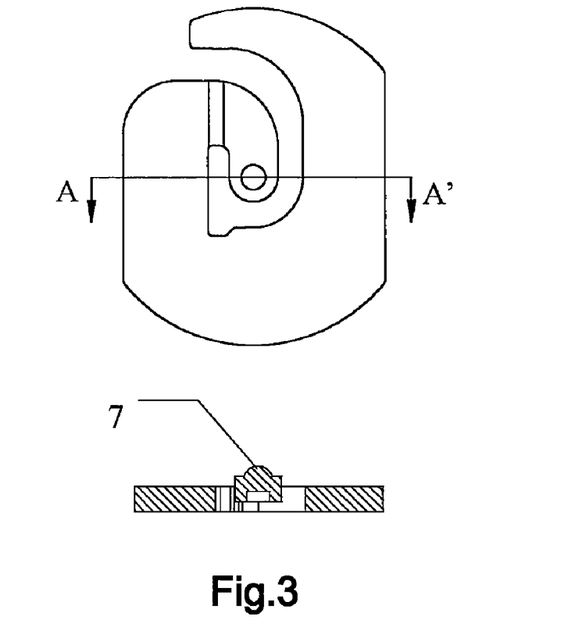
FIG. 3 is a cross-sectional view of the weighing sensor according to the present invention along the direction A-A'.
Figure 4:
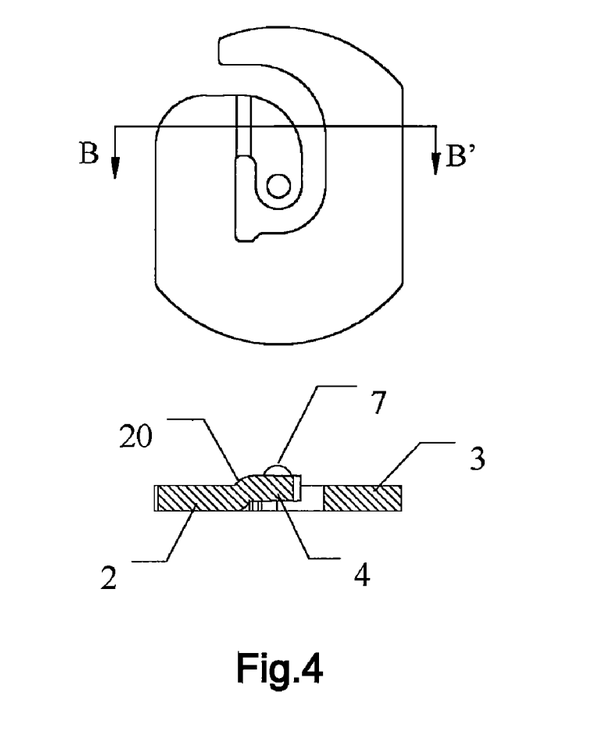
FIG. 4 is a cross-sectional view of the weighing sensor according to the present invention along the direction B-B'.

The load-supporting portion 4 may directly bear the acting force, no need for an additional support fixed thereon. There is a spherical or conical protrusion or depression 7 on one side of the load-supporting portion 4, which bears the acting force. The force directly acts on the top end of the protrusion or the bottom end of the depression, as shown in FIGS. 1 and 3. The load-supporting portion 4, the strain portion 2 and the bearing portion 3 may be substantially situated on the same plane. However, it is preferable to substantially situate the strain portion 2 and the bearing portion 3 on the same plane, while to make the load-supporting portion 4 protrude from this plane via the step 20 provided at the abutting site between the load-supporting portion and the strain portion, as shown in FIGS. 1 and 4.

Figure 5:
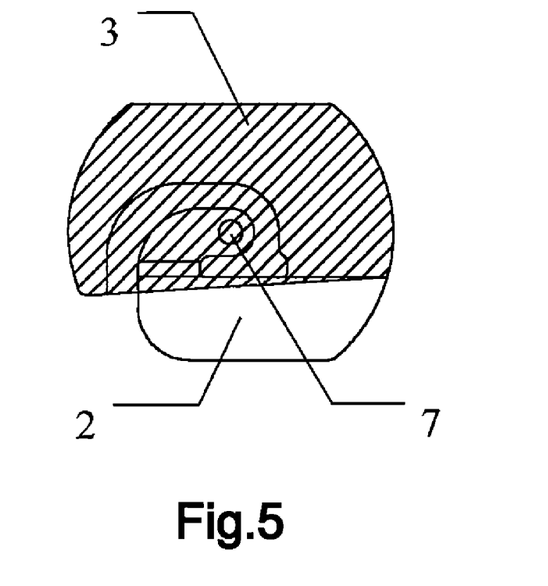
FIGS. 5 and 6 show the position of the stressing point of a load-supporting portion of the weighing sensor according to the present invention on the stress surface of the bearing portion.
Figure 6:
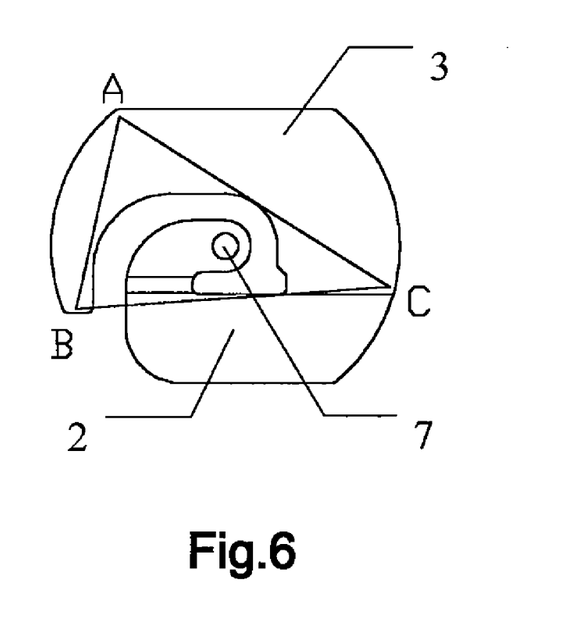

FIGS. 5 and 6 show the position of the stressing point of the load-supporting portion of the weighing sensor according to the present invention on the stress surface of the bearing portion. The "C"-shaped bearing portion 3 fully surrounds the load-supporting portion 4 so that the protrusion or depression 7 on the load-supporting portion 4 is substantially located in the middle of the stress surface of the bearing portion 3. There are at least three such points on the surface of the bearing portion 3 that bears the reaction force, so that the point (e.g., the protrusion or depression 7) for bearing the acting force or the center point on the load-supporting portion 4 must be projected into the triangle defined by said three points along the stressing direction, as shown in FIG. 6. Therefore, the sensor may be kept in balance when the load-supporting portion 4 and the bearing portion 3 bear the acting force and the reaction force which are opposite in directions.

Figure 7:
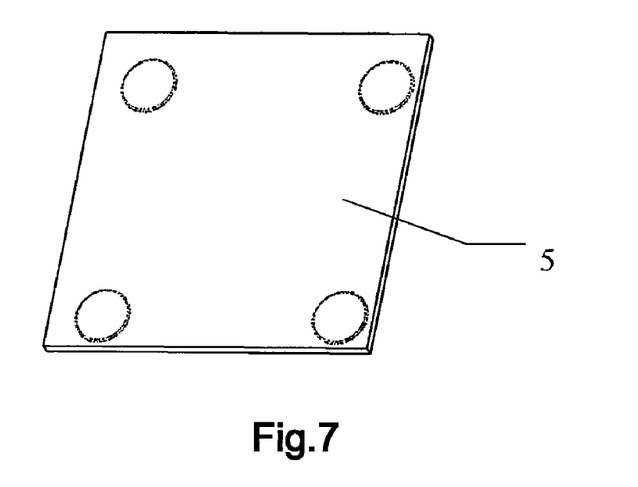
FIG. 7 is an illustration of an electronic scale provided with the sensor shown in FIG. 1.
Figure 8:
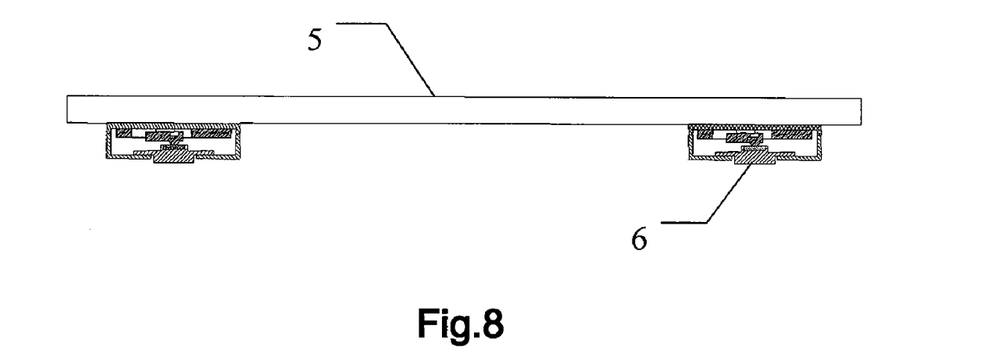
FIG. 8 is a cross-sectional view of FIG. 7.
Figure 9:
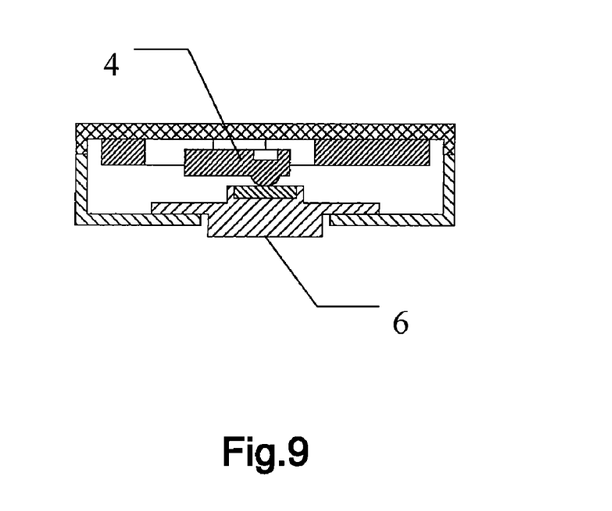
FIG. 9 is a partial enlargement view of the supporting leg shown in FIG. 8.

FIGS. 7 and 8 show an electronic scale having at least three weighing sensors according to the embodiment of the present invention. The bearing portion 3 of the sensor is mounted on the base frame 8 of the scale body 5. The load-supporting portion 4 directly contacts one surface of the supporting leg 6 of the scale, and the other surface of the supporting leg 6 makes contact with the plane on which the scale is positioned. The load-supporting portion 4 of the sensor makes point contact with the supporting leg 6, and there may exist relative movement between them, as shown in FIG. 9.

Figure 10:
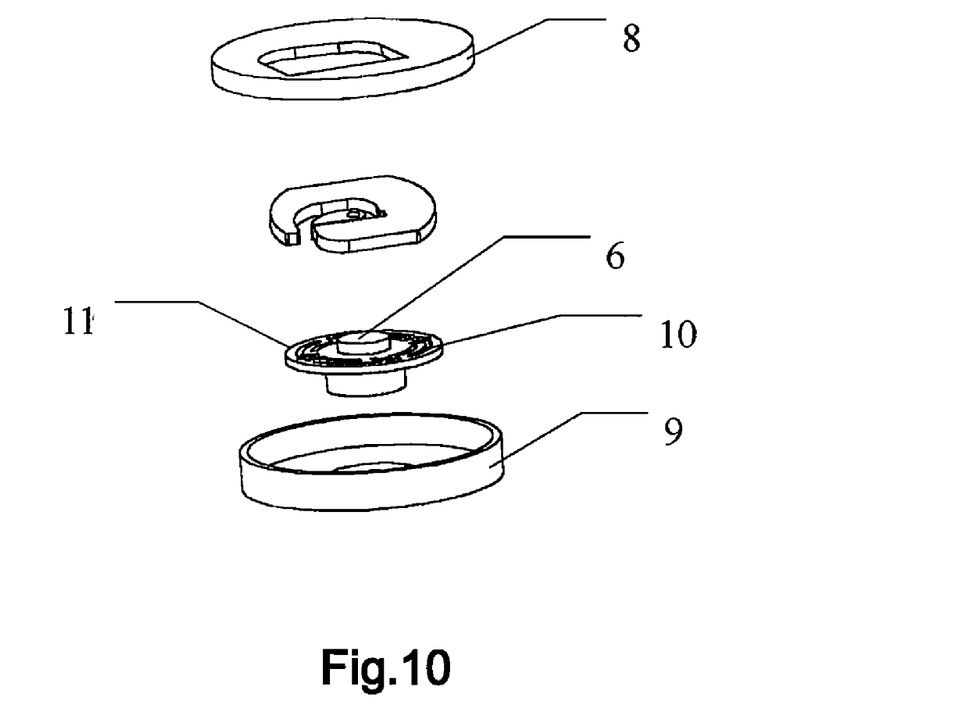
FIG. 10 is a structurally exploded view of the supporting leg.
Figure 11:
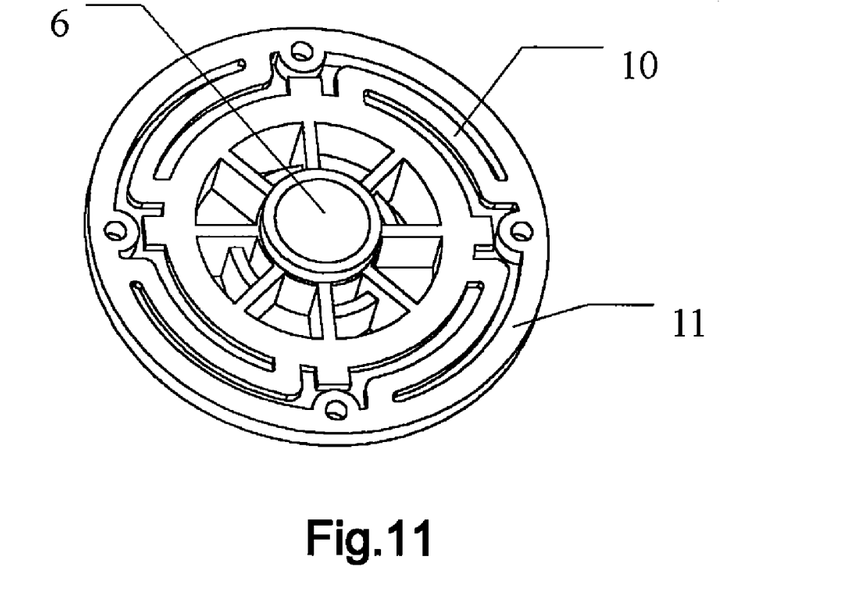
FIG. 11 is a partial enlargement view of the supporting leg.

As shown in FIGS. 10 and 11, the supporting leg of the electronic scale according to the embodiment of the present invention includes a base frame 8, a supporting leg 6 and a cover plate 9. The supporting leg 6 is connected with the surrounding frame 11 through the elastic spokes 10; the surrounding frame 11 is fixed on the cover plate 9; and the cover plate 9 is fixed on the base frame 8. The bearing portion 3 of the sensor is mounted on the base frame 8 to bear the acting force transferred from the scale body. The spherical protrusion 7 on the load-supporting portion 4 of the sensor makes contact with the upper surface of the supporting leg 6, while the lower surface of the supporting leg 6 makes contact with the ground, and the reaction force of the ground, via the supporting leg, is transferred to the spherical protrusion 7 on the load-supporting portion 4 of the sensor. Of course, the supporting leg may also adopt other structures, which are not described in detail herein.

In addition, when there is a spherical or conical depression instead of the protrusion on the load-supporting portion 4 of the sensor, the upper surface of the supporting leg 6 is correspondingly provided with a spherical or conical protrusion.

When the electronic scale is subject to a weight, the acting force and the reaction force are respectively transferred to the load-supporting portion 4 and the bearing portion 3 to deform the strain portion 2, causing changes in the resistance of the strain gauge 1, and the value of the weight is finally measured via an electronic circuit.

What is claimed is:

1. A weighing sensor, comprising a flat plate formed into a helical shape, which includes successively a load-supporting portion, a strain portion, and a bearing portion from the center to the outer of the helical flat plate, with the load-supporting portion situated between and surrounded by the bearing portion and the strain portion, wherein the load-supporting portion and the bearing portion are respectively used to bear an acting force and a reaction force which are opposite in directions, wherein a strain gauge is mounted on the strain portion, and wherein the bearing portion is substantially in a "C"-shape and surrounds the load-supporting portion from three sides, while the strain portion is substantially in a flat-block shape and surrounds the load-supporting portion from the remaining side.

2. The weighing sensor according to claim 1, wherein the strain portion and the bearing portion are substantially situated on the same plane, while the load-supporting portion protrudes from this plane via a step provided at the abutting site between the load-supporting portion and the strain portion.

3. The weighing sensor according to claim 1, which is integrally formed with one piece of sheet metal.

4. The weighing sensor according to claim 1, wherein the helical shape of the flat plate is in the form of a spiral.

5. The weighing sensor according to claim 4, wherein the bearing portion and the strain portion are in the same plane when no load is applied to the bearing portion.

6. A weighing sensor, comprising a flat plate formed into a helical shape, which includes successively a load-supporting portion, a strain portion, and a bearing portion from the center to the outer of the helical flat plate, with the load-supporting portion situated between and surrounded by the bearing portion and the strain portion, wherein the load-supporting portion and the bearing portion are respectively used to bear an acting force and a reaction force which are opposite in directions, wherein a strain gauge is mounted on the strain portion, wherein the helical shape of the flat plate is in the form of a spiral, and wherein the bearing portion and the load-supporting portion are in different planes when no load is applied to the bearing portion.

7. A weighing sensor, comprising a flat plate formed into a helical shape, which includes successively a load-supporting portion, a strain portion, and a bearing portion from the center to the outer of the helical flat plate, with the load-supporting portion situated between and surrounded by the bearing portion and the strain portion, wherein the load-supporting portion and the bearing portion are respectively used to bear an acting force and a reaction force which are opposite in directions, wherein a strain gauge is mounted on the strain portion, wherein the bearing portion is substantially in a "C"-shape and extends around and is spaced from the load-supporting portion on three sides of the load-supporting portion, and wherein the strain portion is substantially rectangular and extends along and is spaced from the load-supporting portion from the remaining side of the load-supporting portion.

8. The weighing sensor according to claim 7, wherein the substantially rectangular strain portion has curved ends.

9. The weighing sensor according to claim 4, wherein the bearing portion and the load-supporting portion are in different planes when no load is applied to the bearing portion.

* * * * *